(12) United States Patent
Scepanovic et al.

(10) Patent No.: US 9,869,847 B2
(45) Date of Patent: Jan. 16, 2018

(54) NEAR-INFRARED IMAGING LENS

(71) Applicant: APPLE INC., Cupertino, CA (US)

(72) Inventors: Miodrag Scepanovic, San Jose, CA (US); Yoshikazu Shinohara, Cupertino, CA (US); Yuhong Yao, San Jose, CA (US)

(73) Assignee: APPLE INC., Cupertino, CA (US)

( * ) Notice: Subject to any disclaimer, the term of this patent is extended or adjusted under 35 U.S.C. 154(b) by 81 days.

(21) Appl. No.: 15/017,637

(22) Filed: Feb. 7, 2016

(65) Prior Publication Data
US 2017/0123192 A1    May 4, 2017

Related U.S. Application Data

(60) Provisional application No. 62/247,768, filed on Oct. 29, 2015.

(51) Int. Cl.
G02B 13/14 (2006.01)
G02B 5/20 (2006.01)
G02B 13/00 (2006.01)
G02B 27/00 (2006.01)

(52) U.S. Cl.
CPC ............. G02B 13/14 (2013.01); G02B 5/208 (2013.01); G02B 13/004 (2013.01); G02B 27/0018 (2013.01)

(58) Field of Classification Search
None
See application file for complete search history.

(56) References Cited

U.S. PATENT DOCUMENTS 7,453,654 B2  11/2008  Shinohara
7,911,715 B2   3/2011  Shinohara
9,720,213 B2   8/2017  Kamitakahara et al.
(Continued)

FOREIGN PATENT DOCUMENTS

CN  201383031 Y   1/2010
CN  201654312 U  11/2010
(Continued)

OTHER PUBLICATIONS

CN Utility Model Patent ZL 201621182555.3—Utility Model Patentability Evaluation Report dated Sep. 18, 2017.
(Continued)

Primary Examiner — Derek S Chapel
(74) Attorney, Agent, or Firm — D. Kligler IP Services Ltd.

(57) ABSTRACT

An optical system for operation at a target near-infrared (NIR) wavelength in imaging an object onto an image plane. The system includes the following optical elements, arranged in order from object side to image side: a first lens, including a first material having a first index of refraction at the target NIR wavelength and having a positive refractive power; a second lens comprising the first material and having a meniscus shape; a third lens comprising the first material and having a meniscus shape; and a fourth lens, including a second material having a second index of refraction at the target NIR wavelength that is lower than the first index of refraction, and having front and rear surfaces of an aspheric form. The aspheric coefficients are chosen so that rays are not totally internally reflected within the fourth lens to impinge on the image plane.

14 Claims, 4 Drawing Sheets

(56) References Cited

U.S. PATENT DOCUMENTS

| | | | | |
|---|---|---|---|---|
| 2003/0210475 A1* | 11/2003 | Shinohara | ............... | G02B 9/12 |
| | | | | 359/716 |
| 2012/0327521 A1* | 12/2012 | Tsai | ................... | G02B 13/004 |
| | | | | 359/715 |
| 2014/0036133 A1* | 2/2014 | Sekine | ............... | G02B 13/004 |
| | | | | 348/340 |
| 2015/0370039 A1* | 12/2015 | Bone | .................. | G02B 13/004 |
| | | | | 359/715 |
| 2016/0011399 A1* | 1/2016 | Hashimoto | ........ | G02B 27/0025 |
| | | | | 359/714 |

FOREIGN PATENT DOCUMENTS

| | | |
|---|---|---|
| CN | 101950066 A | 1/2011 |
| CN | 102213821 A | 10/2011 |
| CN | 102778746 A | 11/2012 |
| JP | 2000019392 A | 1/2000 |

OTHER PUBLICATIONS

TW Utility Model # M547678 Evaluation Report dated Nov. 17, 2017.

* cited by examiner

NEAR-INFRARED IMAGING LENS

FIELD OF THE INVENTION

The present invention relates generally to optics, and particularly to high-resolution imaging lenses.

BACKGROUND

Near-infrared (NIR) imaging devices capture light in the wavelength range of 800 nm to 1300 nm. Such devices are used, inter alia, for medical diagnosis, food inspection and night vision. NIR imaging devices have also attracted increasing interest for application in various consumer electronic technologies, such as pattern-based depth mapping.

SUMMARY

Embodiments of the present invention that are described hereinbelow provide improved optical systems and methods for their design.

There is therefore provided, in accordance with an embodiment of the invention, an optical system for operation at a target near-infrared (NIR) wavelength in imaging an object onto an image plane. The system includes the following optical elements, arranged in order from object side to image side: a first lens, including a first material having a first index of refraction at the target NIR wavelength and having a positive refractive power; a second lens including the first material and having a first meniscus shape; a third lens including the first material and having a second meniscus shape; and a fourth lens, including a second material having a second index of refraction at the target NIR wavelength that is lower than the first index of refraction. The fourth lens has front and rear surfaces of an aspheric form, with at least one inflection point in at least one of the surfaces, and with aspheric coefficients chosen so that rays reaching the rear surface from the object are not totally internally reflected within the fourth lens to impinge on the image plane.

In some embodiments, the system includes a bandpass filter, configured to block light other than at the target NIR wavelength, arranged between the fourth lens and the image plane.

In a disclosed embodiment, the optical elements are configured to form an image at F/2.0 with a diagonal full field of view greater than 80°, and image brightness at an edge of the field that is greater than 30% of the image brightness on axis.

Typically, the system includes an aperture stop adjacent to the first lens.

In a disclosed embodiment, the first lens has a convex front surface, and both the front and rear surfaces of the fourth lens have respective inflection points.

In some embodiments, the aspheric coefficients of the front and rear surfaces of the fourth lens are chosen so that a plane tangent to either of the front and rear surfaces, at any location that can be intercepted by a ray entering the system from the object side, is inclined by no more than a predefined maximum angle relative to a plane perpendicular to an optical axis of the system. In one embodiment, the optical elements are configured to form an image at F/2.0 with a diagonal full field of view greater than 80°, and the predefined maximum angle is no greater than 45°.

There is also provided, in accordance with an embodiment of the invention, a method for producing an optical system for operation at a target near-infrared (NIR) wavelength in imaging an object onto an image plane. The method includes arranging the following optical elements in order from object side to image side: a first lens, including a first material having a first index of refraction at the target NIR wavelength and having a positive refractive power; a second lens including the first material and having a first meniscus shape; a third lens including the first material and having a second meniscus shape; and a fourth lens, including a second material having a second index of refraction at the target NIR wavelength that is lower than the first index of refraction, and having front and rear surfaces of an aspheric form, with at least one inflection point in at least one of the surfaces. Aspheric coefficients of the front and rear surfaces of the fourth lens are chosen so that rays reaching the rear surface from the object are not totally internally reflected within the fourth lens to impinge on the image plane. The present invention will be more fully understood from the following detailed description of the embodiments thereof, taken together with the drawings in which:

DETAILED DESCRIPTION OF EMBODIMENTS

Current NIR imaging devices are most commonly adapted from imaging lenses designed for visible (VIS) photography, with the addition of an NIR bandpass filter. The performance and form factor of such systems can be hindered, however, by the spectral differences between VIS and NIR. In particular, optical materials are generally less dispersive in the spectral region of interest for most NIR imaging applications. This characteristic enables arrangement of high refractive-index, dispersive materials in an NIR imaging lens to facilitate aberration control within certain NIR spectral regions. Such an arrangement is, on the other hand, typically not suitable for VIS imaging due to the occurrence of excessive chromatic aberrations. Thus, different design considerations will apply to lens systems that are to be used in NIR narrowband imaging applications.

Embodiments of the present invention exploit this design approach to provide fast, wide-angle, miniature imaging lenses that can be used for high-resolution NIR imaging, for example in portable electronic devices. A particular embodiment that is described hereinbelow provides a lens of this sort that is capable of operating at F/2.0 with a diagonal full field of view of 84°, and with optical distortion no greater than 2% across the image.

Because such lenses are designed to operate at a single NIR wavelength, the design need not take chromatic aberration into account. Instead, the lens design is optimized to minimize flare from total internal reflection (TIR) at the lens surfaces, as well as maintaining low light fall-off at the image corners. These two characteristics are critical for NIR imaging applications, such as depth mapping based on projected patterns, which require good image reproduction, with high fidelity over the entire field and high immunity against environmental noises, such as stray light.

Figure 1:
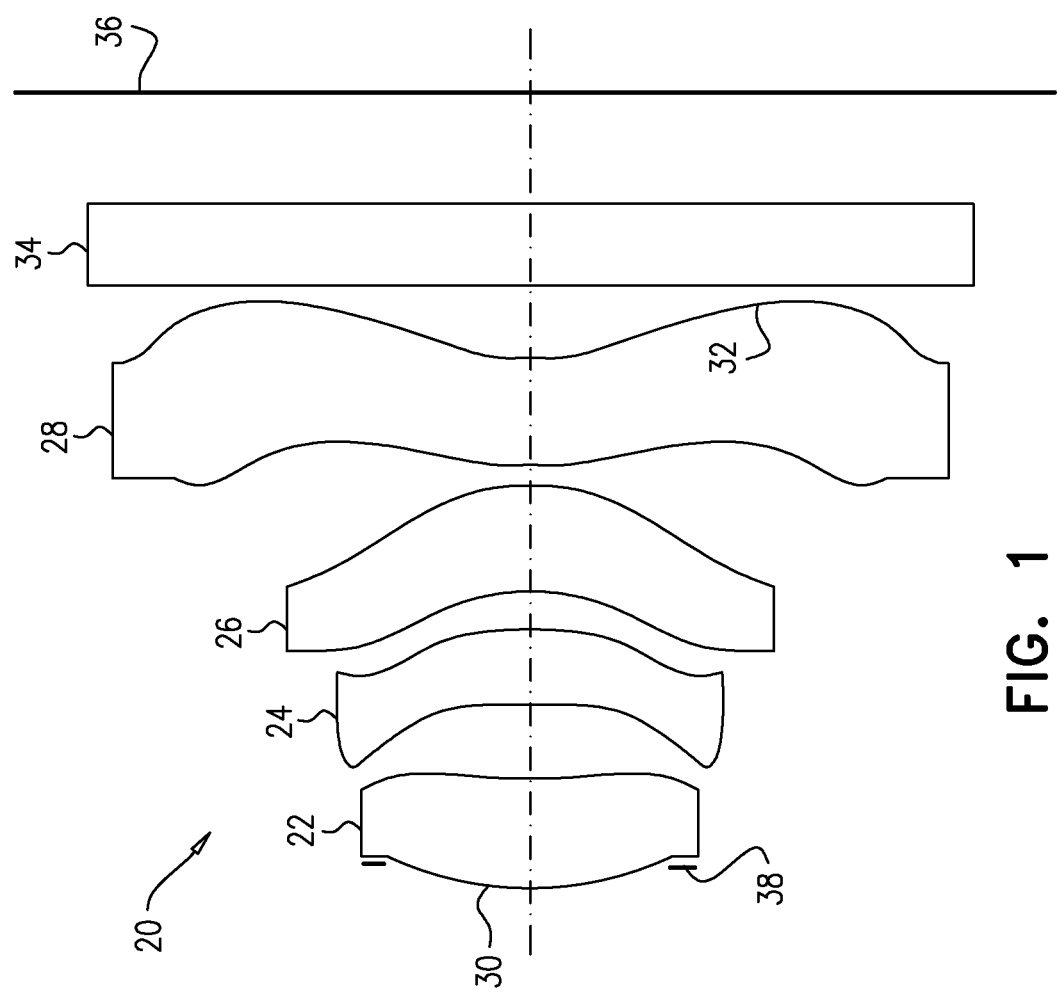
FIG. 1 is a schematic side view of an optical system, in accordance with an embodiment of the invention.

FIG. 1 is a schematic side view of an NIR optical system 20, presented as one example of the claimed design family, in accordance with an embodiment of the invention. As noted earlier, the pictured design is capable of operating at F/2.0 with a diagonal full field of view of 84°, and optical distortion no greater than 2% across the image. It provides an inexpensive, compact, high-quality solution for NIR imaging applications, particularly in portable electronic devices.

Optical system 20 comprises four lens elements with refractive power, marked in order from the object side (at the left of the figure) to an image plane 36 (at the right) as lenses 22, 24, 26 and 28. Lens 22 has a convex front surface 30 and positive optical power, while lens has negative optical power with at least one inflection point in at least a rear lens surface 32. Lenses 24 and 26 are meniscus elements with low optical power, one of which may be positive and the other negative, for example. In the pictured example, the front sides of lenses 24 and 26 are concave, while the rear sides are convex, but at least one of these lenses may be reversed, so that its front side is convex and its rear side concave. Optical system 20 includes an NIR bandpass filter 34 to eliminate interference of unwanted light outside the spectral region of interest.

Lenses 22, 24 and 26 comprise a first, high-index material, such as EP5000 (which has a refractive index n=1.613 at the infrared reference wavelength of the design, 940 nm), while lens 28 comprises a lower-index material, such as APEL 9 (n=1.508 at the infrared reference wavelength of the design, 940 nm). The Abbe v-numbers of these materials are Vd=23.8 for EP5000 and Vd=55.9 for APEL. Although it is convenient, for purposes of design and production, that lenses 22, 24 and 26 comprise the same material, in alternative embodiments at least one of these three lenses may comprise a different high-index material. In the pictured design, all surfaces are aspheric, although in alternative embodiments, one or more of the surfaces of lenses 22, 24 and 26 may be spherical. Lens 28 is bi-aspheric, with inflected front and rear surfaces that are designed to reduce field curvature and distortion at the image plane.

The design shown in FIG. 1 includes an aperture stop 38, which is useful in controlling the brightness of the optical system. Aperture stop 38 is shown at the object side of optical system 20 in FIG. 1 but may alternatively be located elsewhere, for example between lenses 22 and 24. The location of aperture stop 38 also facilitates shortening of the total track length (TTL) of the system, which is desirable particularly in consumer applications, such as in portable electronic devices.

The precise design parameters of optical system 20 as shown in FIG. 1 are listed below in an Appendix. These parameters are presented solely by way of example. Other designs implementing the principles described herein will be apparent to those skilled in the art after reading the present description and are considered to be within the scope of the present invention.

Figure 2:
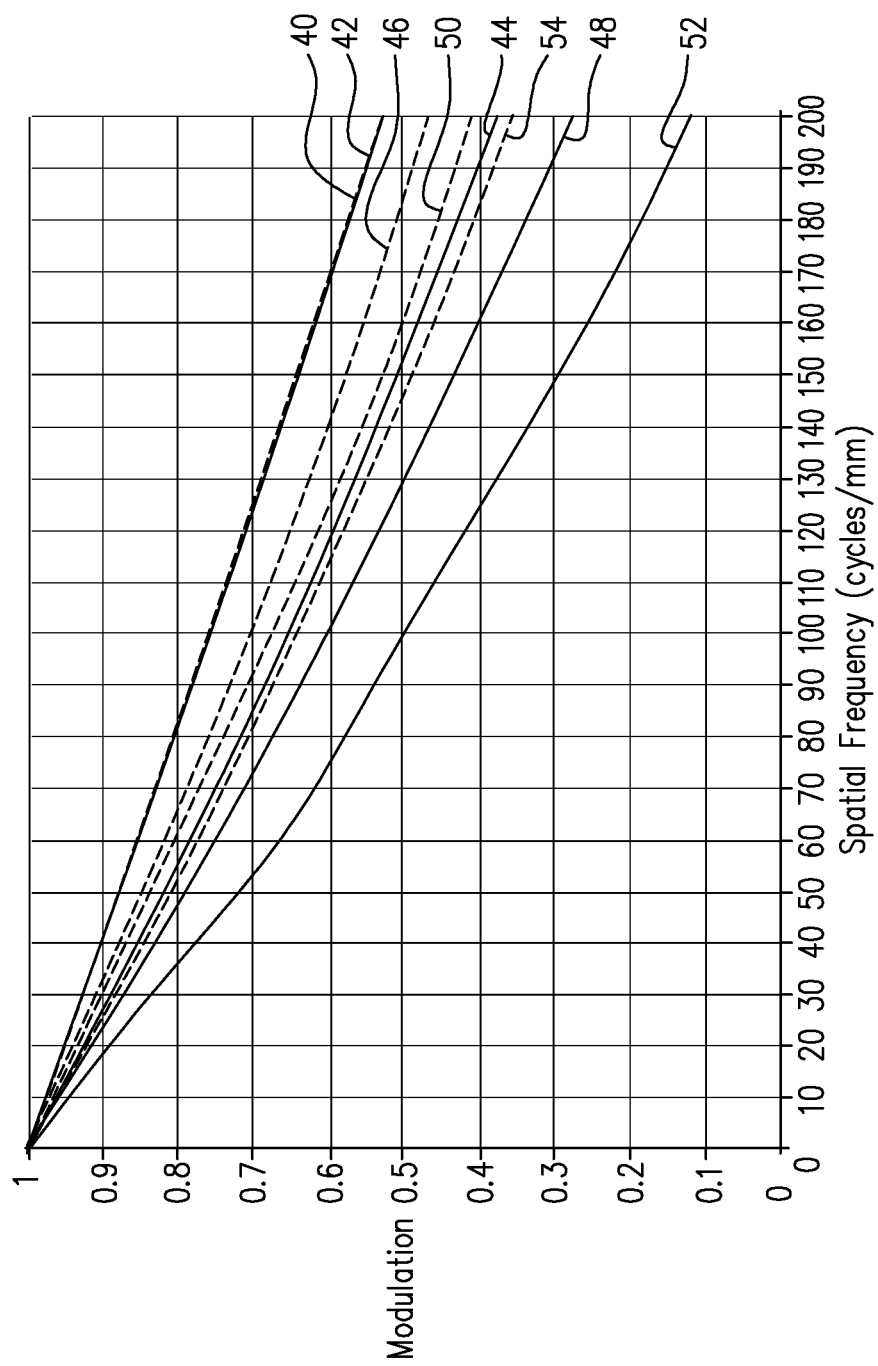
FIG. 2 is a plot of modulation transfer function (MTF) as a function of angle (image height) across the field of view of the optical system of FIG. 1.
Figure 3:
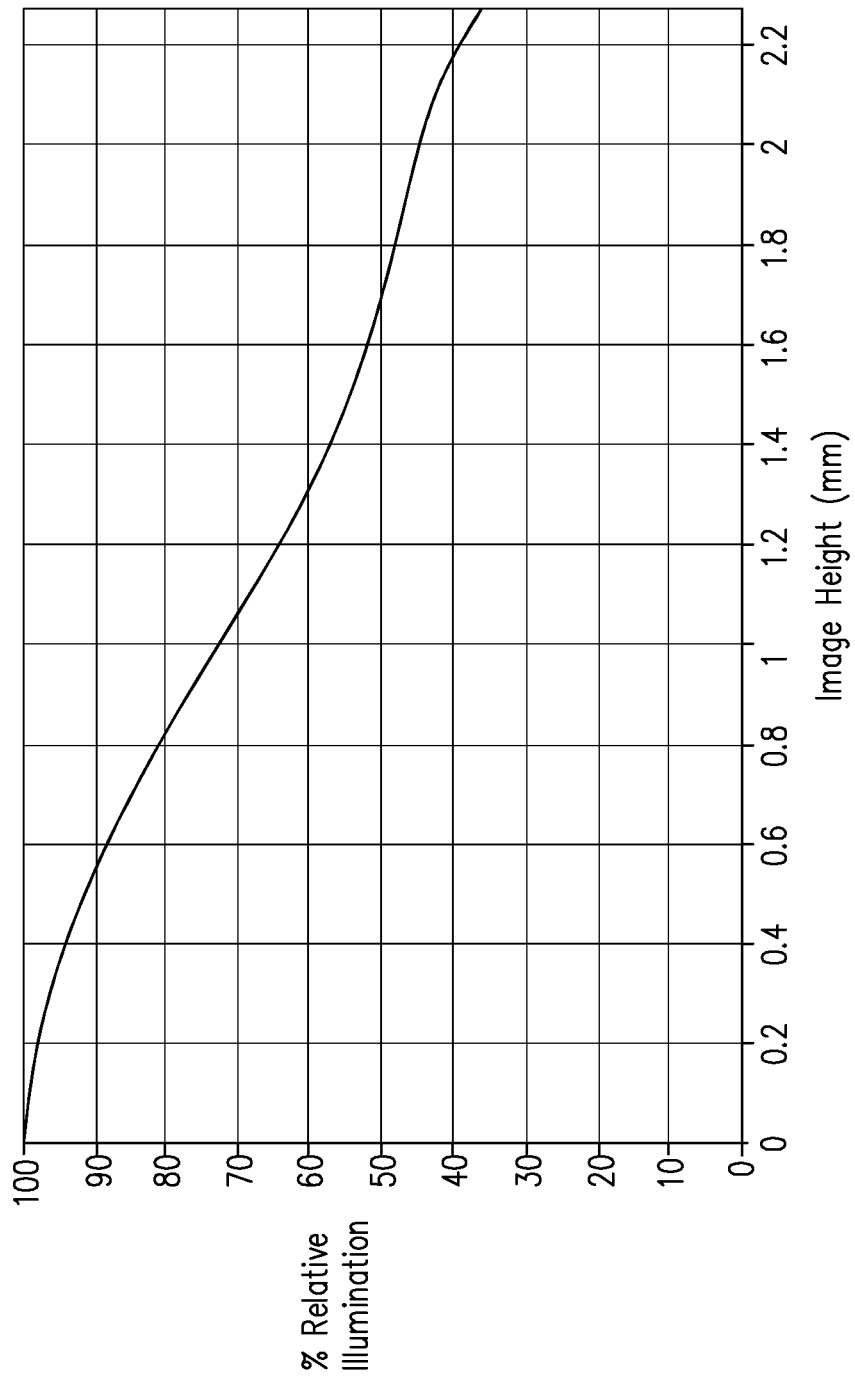
FIG. 3 is a plot of illumination fall-off as a function of angle (image height) across the field of view of the optical system of FIG. 1.

FIGS. 2 and 3, respectively, show the MTF and illumination fall-off with angle (image height) across the field of view of optical system 20. The curves in FIG. 2 correspond to the following image heights relative to the optical axis:

Diffraction limit (40).
Image height zero (42).
Image height 1.135 mm, transverse (44).
Image height 1.135 mm, radial (46).
Image height 1.589 mm, transverse (48).
Image height 1.589 mm, radial (50).
Image height 2.270 mm, transverse (52).
Image height 2.270 mm, radial (54).

At the center of the field, the MTF is greater than 0.5 up to 200 cycles/mm, while at the edge of the field the MTF still remains above 0.5 down to about 100 cycles/mm. Even at the far edges of the field, the image brightness remains above 35% of the brightness on the optical axis. As a result, when incorporated in an NIR electronic imaging system, optical system 20 will give useful levels of image brightness and resolution out to the far edges of the image sensor.

Lens 28 is designed carefully for strict minimization of flare and resulting "ghosts" due to total internal reflection (TIR). This requirement is fulfilled, at least in part, by the use of a low-index material for lens 28 and by designing the surfaces of this lens so that the angle between the normal to the lens surface at any point and the rays striking that point will be less than the TIR angle. In other words, the aspheric coefficients of the front and rear surfaces of lens 28 are chosen so that rays reaching the rear surface from the object are not totally internally reflected within the fourth lens to impinge on the image plane.

Figure 4B:
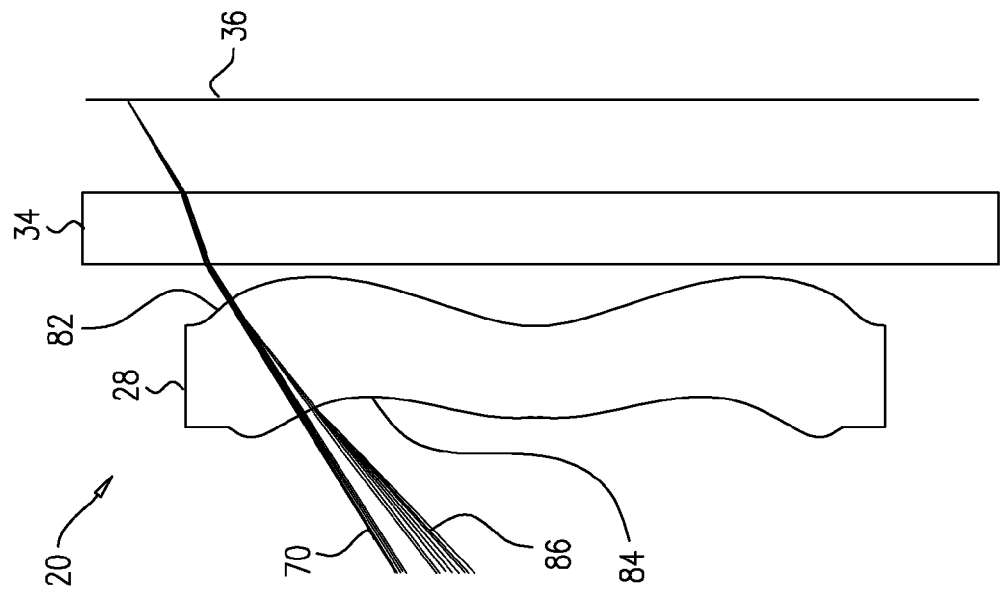
FIG. 4B is a schematic side view of the optical system of FIG. 1, showing a trace of a ray that is reflected within the system while avoiding total internal reflection onto the image plane, in accordance with an embodiment of the invention.
Figure 4A:
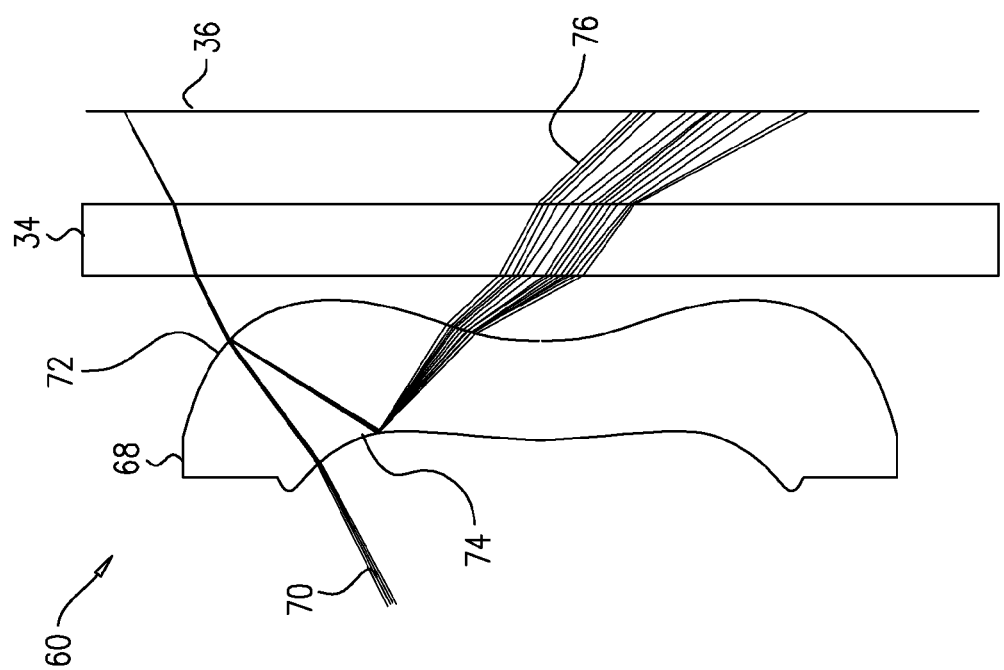
FIG. 4A is a schematic side view of an example optical system, showing a trace of a ray that is reflected within the system.

FIG. 4A is a schematic side view of an example optical system 60, showing a trace of a high-angle ray 70 that is reflected within the system, for purposes of comparison with system 20. System 60 is similar in design to system 20, but does not take the limitation on TIR into account in choosing the aspheric coefficients. Ray 70 passes through the first three lenses (which are similar to lenses 22, 24 and 26), and is then internally reflected at a rear surface 72 of a lens 68, followed by TIR at a front surface 74 of the lens. The reflected rays 76 create a ghost image in image plane 36.

FIG. 4B is a schematic side view of system 20, showing how this ghost image is avoided by the present design, in accordance with an embodiment of the invention. Generally speaking, flare due to internal reflections is avoided by designing lens 28 to avoid high angles in a rear surface 82 and a front surface 84 of the lens. Specifically, the aspheric coefficients of the surfaces are chosen so that a plane tangent to either rear surface 82 or front surface 84 of lens 28, at any location that can be intercepted by a ray entering system 20 from the object side, is inclined by no more than a certain maximum angle relative to a plane perpendicular to the optical axis, for example, no more than 45° in the present case. (The higher angle of inclination of surface 72 can be seen in FIG. 4A.) Consequently, a ray reflected from surface 82 is not totally internally reflected within lens 28, but rather passes forward to a harmless scatter location.

In other embodiments of the present invention, the inclination angles of the surfaces of the last lens in the system are similarly limited, although the limiting angle for the inclination of the tangent plane may be smaller or greater, depending upon certain design parameters, including the F/#, field of view, and image sensor characteristics, for example.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—LENS LISTING

The listing below refers to the design shown in FIG. 1. The "Curvature Radius" column gives the radius of curvature of each lens surface on axis, while the "Thickness" column represents the distance from the given surface to the next surface in the design. FOV represents diagonal full field of view of the system. Reference wavelength of the design is 940 nm. The optical materials are defined in terms of their refractive index $n_d$ and Abbe number $v_d$.

Definition of the Lens (F/2.0, 84° FOV)

| Lens Number | Surface number | Curvature Radius (mm) | Thickness (mm) | Materials ($n_d$, $v_d$) |
|---|---|---|---|---|
| Ape. Stop | 1 | Infinity | −0.100 | |
| Lens 1 | *2 | 1.940 | 0.509 | (1.636, 23.8) |
| | *3 | −3.583 | 0.340 | |
| Lens 2 | *4 | −1.492 | 0.354 | (1.636, 23.8) |
| | *5 | −2.631 | 0.190 | |
| Lens 3 | *6 | −1.864 | 0.485 | (1.636, 23.8) |
| | *7 | −1.633 | 0.100 | |
| Lens 4 | *8 | −14.288 | 0.501 | (1.545, 55.9) |
| | *9 | 670.978 | 0.350 | |
| Filter | 10 | Infinity | 0.400 | (1.517, 64.2) |
| | 11 | Infinity | 0.518 | |
| Infrared Sensor | 12 | Infinity | — | |

*Aspheric surfaces (aspheric coefficient given below)

Aspheric Coefficients

| | Surface # | | | |
|---|---|---|---|---|
| | 2 | 3 | 4 | 5 |
| K | 0 | 0 | 0 | 0 |
| A4 | −6.1800E−02 | −1.3970E−01 | −4.3990E−01 | −3.3520E−01 |
| A6 | 7.0570E−01 | −3.3840E−01 | −2.1931E+00 | −1.2594E+00 |
| A8 | −8.3284E+00 | −8.0950E−01 | 1.4496E+01 | 4.7843E+00 |
| A10 | 5.0210E+01 | 1.0551E+01 | −7.8165E+01 | −7.0499E+00 |
| A12 | −1.7860E+02 | −5.4267E+01 | 2.2888E+02 | 1.1809E+01 |
| A14 | 3.6407E+02 | 1.3394E+02 | −3.1520E+02 | −1.2247E+01 |
| A16 | −3.8409E+02 | −1.6129E+02 | 1.7887E+02 | 3.6226E+00 |
| A18 | 1.3538E+02 | 7.5922E+01 | −2.5596E+01 | 7.5410E−01 |
| A20 | 3.7156E+01 | 0.0000E+00 | 6.1908E+00 | 9.0300E−02 |
| A22 | 0.0000E+00 | 0.0000E+00 | 0.0000E+00 | 0.0000E+00 |
| A24 | 0.0000E+00 | 0.0000E+00 | 0.0000E+00 | 0.0000E+00 |

| | Surface # | | | |
|---|---|---|---|---|
| | 6 | 7 | 8 | 9 |
| K | 0 | 0 | 0 | 0 |
| A4 | −1 | −1 | −1 | −1 |
| A6 | 3.0630E−01 | 1.9300E−02 | −5.5800E−01 | −7.8186E−01 |
| A8 | −2.0301E+00 | 4.4270E−01 | 3.8957E−01 | 9.9196E−01 |
| A10 | 4.8172E+00 | −2.9650E+00 | 2.9844E−01 | −1.0208E+00 |
| A12 | 1.9964E+01 | 1.3527E+01 | −1.1968E+00 | 7.3365E−01 |
| A14 | −1.0432E+02 | −3.0734E+01 | 1.4548E+00 | −3.2381E−01 |
| A16 | 1.9769E+02 | 3.8738E+01 | −9.7214E−01 | 4.8611E−02 |
| A18 | −1.9538E+02 | −2.8100E+01 | 3.7722E−01 | 3.3429E−03 |
| A20 | 1.0104E+02 | 1.1061E+01 | −7.9284E−02 | −2.3856E−02 |
| A22 | −2.1733E+01 | −1.8336E+00 | 7.0513E−03 | 6.9725E−03 |
| A24 | 0.0000E+00 | 0.0000E+00 | −2.6420E−05 | −1.0262E−03 |

$$z = \frac{cr^2}{1 + sqrt[1-(1+K)c^2r^2]} + A_4r^4 + A_6r^6 + A_8r^8 + A_{10}r^{10} + A_{12}r^{12} + A_{14}r^{14} + A_{16}r^{16} + A_{18}r^{18} + A_{20}r^{20} + A_{22}r^{22} + A_{24}r^{24}.$$

Here z is the sag of the surface parallel to the z-axis.
c is the curvature at the pole of the surface.
K is the conic constant.
$A_4$-$A_{24}$ are the aspheric coefficients.

The invention claimed is:

1. An optical system for operation at a target near-infrared (NIR) wavelength in imaging an object onto an image plane, the system comprising the following optical elements, arranged in order from object side to image side:
   a first lens, comprising a first material having a first index of refraction at the target NIR wavelength and having a positive refractive power;
   a second lens comprising the first material and having a first meniscus shape;
   a third lens comprising the first material and having a second meniscus shape; and
   a fourth lens, comprising a second material having a second index of refraction at the target NIR wavelength that is lower than the first index of refraction, and having front and rear surfaces of an aspheric form, with at least one inflection point in at least one of the surfaces, and with aspheric coefficients chosen so that rays reaching the rear surface from the object are not totally internally reflected within the fourth lens to impinge on the image plane.

2. The system according to claim 1, and comprising a bandpass filter, configured to block light other than at the target NIR wavelength, arranged between the fourth lens and the image plane.

3. The system according to claim 1, wherein the optical elements are configured to form an image with an image brightness at an edge of a field of view of the image that is greater than 30% of the image brightness on axis.

4. The system according to claim 1, and comprising an aperture stop adjacent to the first lens.

5. The system according to claim 1, wherein the first lens has a convex front surface, and wherein both the front and rear surfaces of the fourth lens have respective inflection points.

6. The system according to claim 1, wherein the aspheric coefficients of the front and rear surfaces of the fourth lens are chosen so that a plane tangent to either of the front and rear surfaces, at any location that can be intercepted by a ray entering the system from the object side, is inclined by no more than a predefined maximum angle relative to a plane perpendicular to an optical axis of the system.

7. The system according to claim 1, wherein the optical elements are configured to form an image at F/2.0 with a diagonal full field of view greater than 80°, and wherein the predefined maximum angle is no greater than 45°.

8. A method for producing an optical system for operation at a target near-infrared (NIR) wavelength in imaging an object onto an image plane, the method comprising:
   arranging the following optical elements in order from object side to image side:
      a first lens, comprising a first material having a first index of refraction at the target NIR wavelength and having a positive refractive power;
      a second lens comprising the first material and having a first meniscus shape;

a third lens comprising the first material and having a second meniscus shape; and a fourth lens, comprising a second material having a second index of refraction at the target NIR wavelength that is lower than the first index of refraction, and having front and rear surfaces of an aspheric form, with at least one inflection point in at least one of the surfaces choosing aspheric coefficients of the front and rear surfaces of the fourth lens so that rays reaching the rear surface from the object are not totally internally reflected within the fourth lens to impinge on the image plane.

9. The method according to claim 8, and comprising inserting a bandpass filter, configured to block light other than at the target NIR wavelength, between the fourth lens and the image plane.

10. The method according to claim 8, wherein the optical elements are arranged to form an image with an image brightness at an edge of a field of view of the image that is greater than 30% of the image brightness on axis.

11. The method according to claim 8, and comprising inserting an aperture stop adjacent to the first lens.

12. The method according to claim 8, wherein the first lens has a convex front surface, and wherein both the front and rear surfaces of the fourth lens have respective inflection points.

13. The method according to claim 8, wherein the aspheric coefficients of the front and rear surfaces of the fourth lens are chosen so that a plane tangent to either of the front and rear surfaces, at any location that can be intercepted by a ray entering the system from the object side, is inclined by no more than a predefined maximum angle relative to a plane perpendicular to an optical axis of the system.

14. The method according to claim 8, wherein the optical elements are arranged to form an image at F/2.0 with a diagonal full field of view greater than 80°, and wherein the predefined maximum angle is no greater than 45°.

\* \* \* \* \*